United States Patent [19]

Roche

[11] 4,117,388
[45] Sep. 26, 1978

[54] ALTERNATING CURRENT GENERATOR

[75] Inventor: Lawrence R. Roche, Sioux City, Iowa

[73] Assignee: Dyna Technology, Inc., Sioux City, Iowa

[21] Appl. No.: 757,498

[22] Filed: Jan. 7, 1977

[51] Int. Cl.² ............................................... H02P 9/10
[52] U.S. Cl. ........................................ 322/25; 322/63; 322/75
[58] Field of Search ........................ 322/44, 63, 66, 75, 322/28, 59, 25

[56] References Cited

U.S. PATENT DOCUMENTS

| 3,344,338 | 9/1967 | Sparrow | 322/75 |
| 3,702,964 | 11/1972 | Kudlacik et al. | 322/25 X |
| 3,771,046 | 11/1973 | Harter | 322/63 |

Primary Examiner—Robert J. Hickey
Attorney, Agent, or Firm—Burns, Doane, Swecker & Mathis

[57] ABSTRACT

A dynamo electric machine including an alternating current generator and a brushless exciter for the generator field, wherein control and compounding field windings of the exciter are energized from the generator stator winding through stationary rectifier circuits, the rectifier circuit for the compounding field making connection with the generator stator winding in the vicinity of its neutral point to avoid impressing high voltage to ground on rectifiers of the circuit.

14 Claims, 10 Drawing Figures

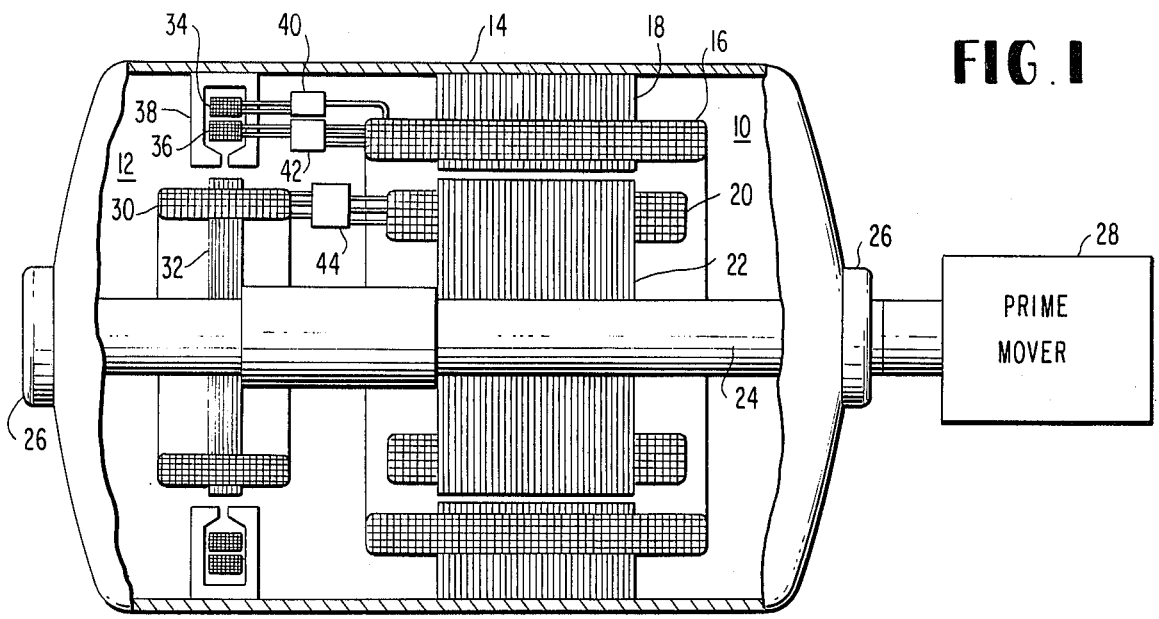
FIG. 1
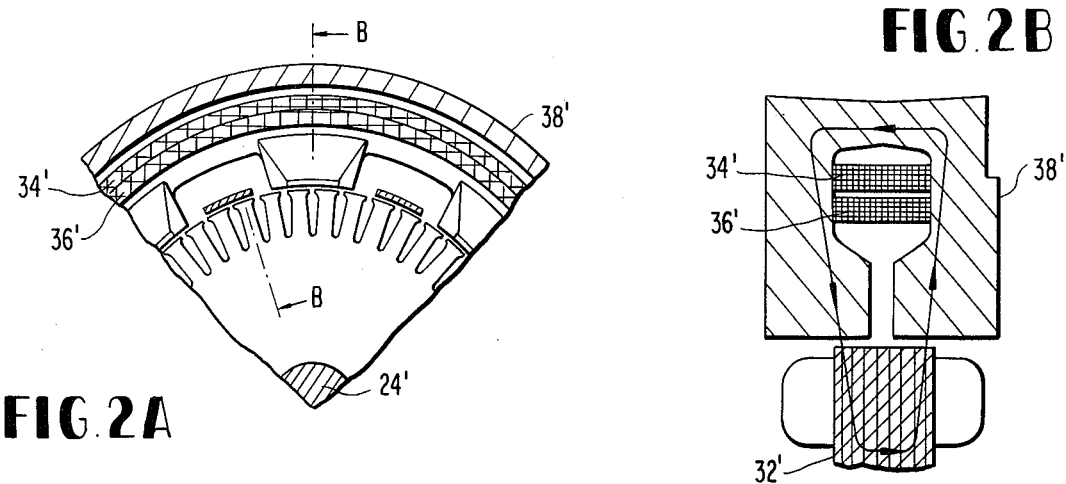
FIG. 2A
FIG. 2B
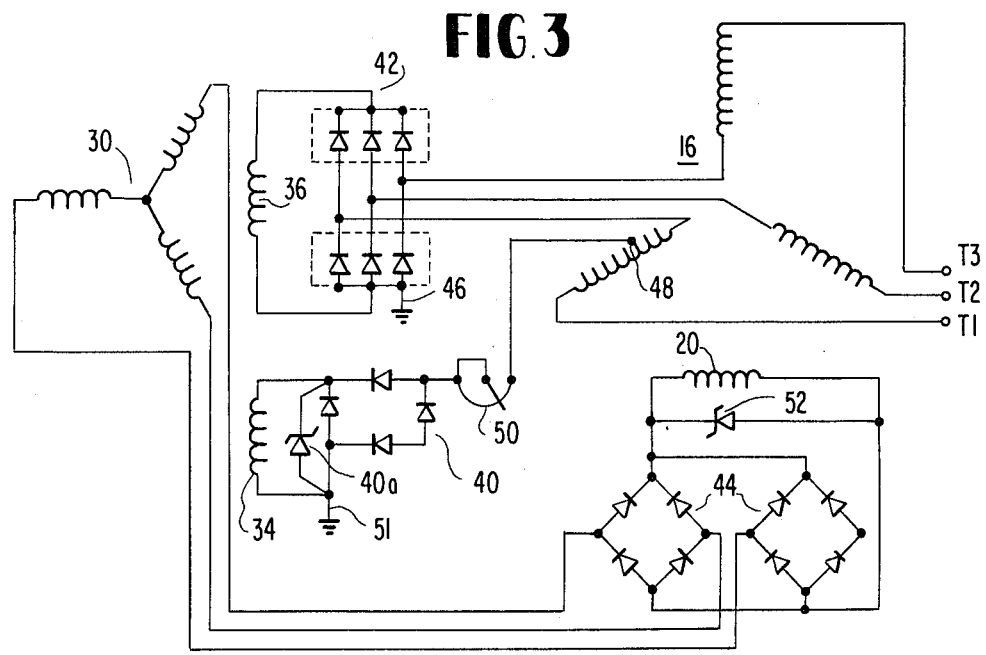
FIG. 3

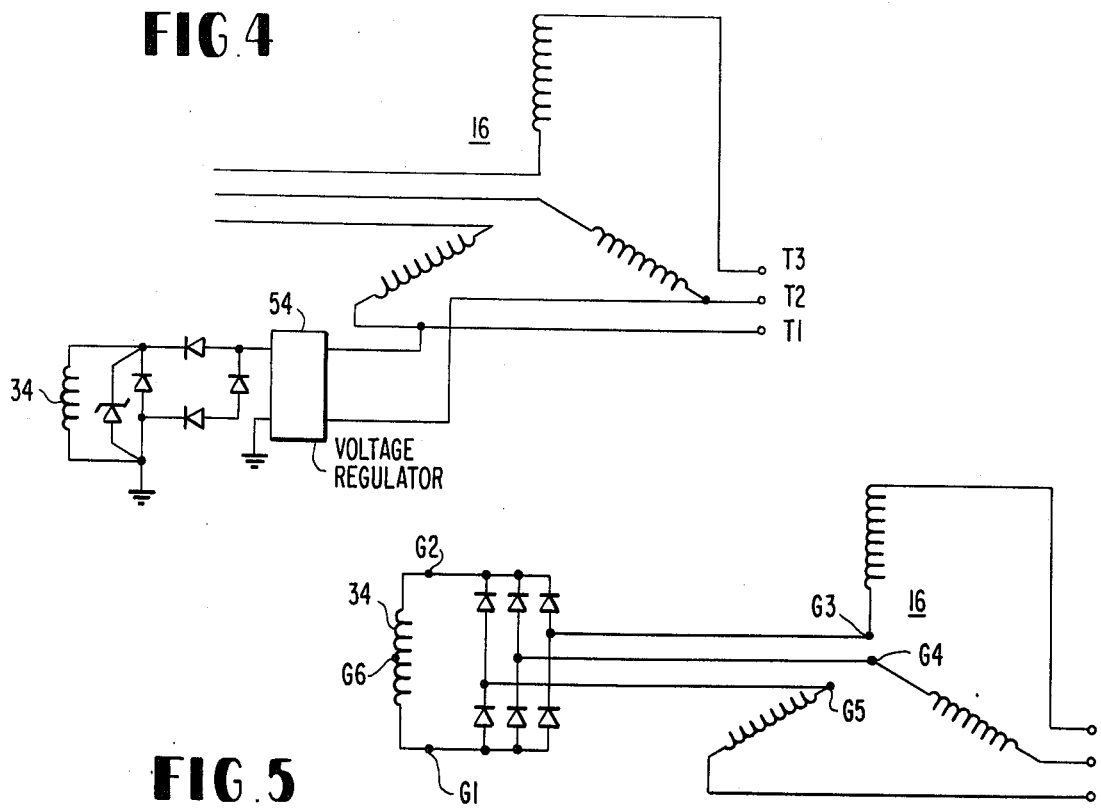
FIG.4
FIG.5
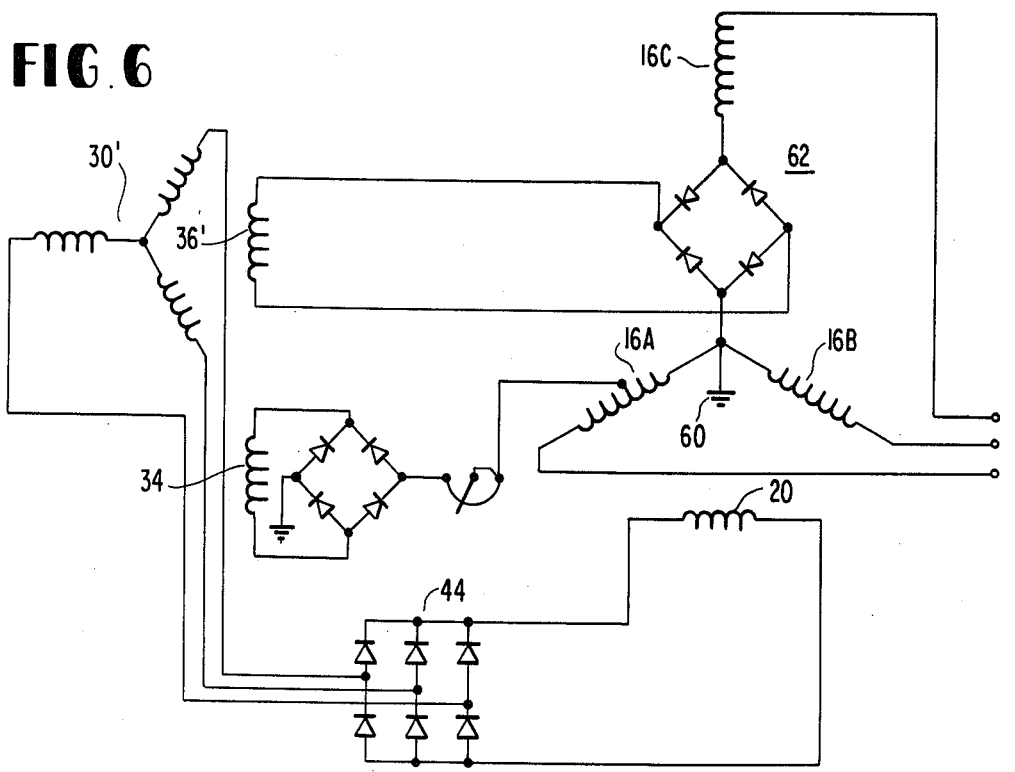
FIG.6

ALTERNATING CURRENT GENERATOR

BACKGROUND OF THE INVENTION

A usual electric generator system includes a wound stator associated with a field structure that is energized with a D.C. current and rotated relative to the stator. One way of providing the direct current for energization of the field winding is to obtain alternating current energy from the generator stator windings by means of a stationary transformer, rectify the output current of the transformer and apply the resulting D.C. voltage to the field winding through a slip-ring and brush connections.

Another system comprises a dynamo electric machine involving a synchronous generator used with a brushless transformer exciter, an example of such a system being disclosed in U.S. Pat. No. 3,210,644 granted to Sparrow. That patent discloses a transformer exciter having a voltage generating rotor driven with the rotating field winding of the generator and operatively coupled with a stator winding or windings energized with alternating current in series with the load end or ends of a phase or phase windings of the generator stator. The current generated in the exciter rotor is rectified and the output of the rectifier applied to the generator field winding. Also, a voltage tap may be made between a point or points near the load end or ends of the generator stator winding or windings to additionally apply a voltage-responsive alternating current voltage to a part or parts of the stator winding or windings. Voltage regulation may be obtained by including a variable impedance winding in series or parallel with the exciter stator winding or windings.

Another brushless type of alternating current generator in combination with an exciter is disclosed in U.S. Pat. No. 3,344,338, also to Sparrow. In that patent, the exciter is energized with direct current from the AC generator stator. The exciter includes a D.C. main field winding energized through a full-wave rectifier connected across the load side of two phase windings of a three phase generator stator and also across a second full-wave rectifier connected to the secondary of a current transformer having its primary connected in series in the load end of one of the generator stator phase windings. The field core of the exciter is constructed to receive another winding energized from a voltage regulator at the output of the generator stator and the core is subject to saturation when this winding is energized to provide a suppressor type voltage control.

The first mentioned prior art construction requires a special potential current transformer and is subject to the disadvantages of slip ring constructions. The Sparrow U.S. Pat. No. 3,344,338 construction also has the disadvantage of requiring transformers. Also the rectifiers therein are subjected to high output voltages subjecting them to breakdown stresses. The device of Sparrow U.S. Pat. No. 3,210,644 requires a complicated exciter structure providing rotating transformer action.

SUMMARY OF THE INVENTION

In accordance with the invention, a dynamo electric machine comprises a synchronous generator having a stator winding and a rotating field winding along with a brushless exciter and a stator control field and stator compounding or forcing field as well as a rotor which supplies D.C. energization to the generator field winding through a rotating rectifier circuit. The stator control field is energized with a rectified voltage having a small amplitude for accommodating generator no load conditions and may be preset as by a rheostat. The exciter compounding or forcing field is energized with a rectified D.C. current having a magnitude varying with the amplitude of the generator load current. The connection of the compounding or forcing field may be through a rectifier circuit at a location at or near the neutral point of a multiphase winding of the generator stator winding. The rectifier circuit will then be near ground potential and the danger of a short circuit to ground due to high voltage is avoided. The voltage for the control field winding may be taken from a connection made near the neutral end of one of the phase windings of the stator.

It is accordingly an object of the present invention to overcome the drawback of prior dynamo electric generators as discussed hereinabove.

It is another object of the invention to provide a synchronous generator of the brushless exciter type which provides effective voltage control at both no-load and load conditions with a simple construction that avoids exposure of rectifier elements therein to danger of high voltage breakdowns to ground.

DESCRIPTION OF THE DRAWINGS

FIG. 1 is a fragmentary transverse sectional view, partly schematic, of an alternating current generator embodying the present invention;

FIG. 2A is an enlarged fragmentary sectional view showing the structure of an exciter rotor and stator of a type suitable for use in the generator of FIG. 1, with the section taken in a direction transverse to the rotary axis of the generator.

FIG. 2B is an enlarged fragmentary view of the exciter rotor and stator taken along the line B—B of FIG. 2, showing segments of the rotor and stator windings in place.

FIG. 3 is a circuit diagram of a preferred form of the invention;

FIG. 4 is a fragmentary circuit diagram showing a modification in the preferred form of the invention shown in FIG. 3;

FIG. 5 is a fragmentary circuit diagram showing other preferred forms of the invention, FIG. 6 is a circuit diagram of another preferred form of the invention.

DETAILED DESCRIPTION

Figure 7:
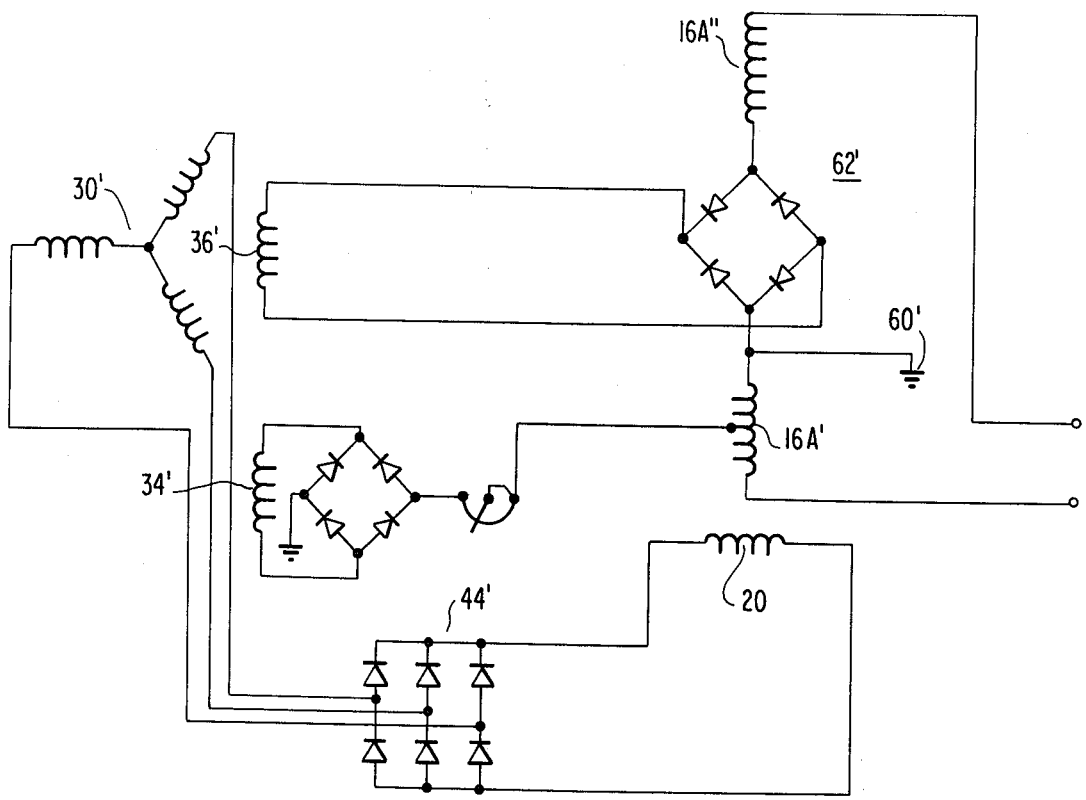
FIG. 7 is a circuit diagram of still another preferred form of the invention.

Referring to FIGS. 1 through 3 of the drawings, the dynamo electric machine of the invention is shown as embodying an alternating current generator 10 and an exciter 12 disposed side-by-side in a casing 14.

Referring particularly to FIG. 1, the generator includes a stator having a winding 16 associated with an appropriate laminated core structure 18. Within the stator is a field coil 20 with its windings associated with appropriate magnetizable laminations 22 mounted for rotation on a shaft 24. The shaft 24 is journalled in suitable bearings 26. Prime mover 28 is provided for driving the shaft 26.

The exciter 12 includes a rotor with a winding 30 disposed on laminated core structure 32 mounted on shaft 24 for rotation therewith. The exciter further includes two stator windings 34 and 36 mounted concentrically in a stator core structure 38.

Outer exciter stator winding 34 is a control field winding connected for energization from generator stator winding 16 with direct current through a rectifier circuit 40. The exciter winding 36 is a compounding field winding. This winding is connected through a rectifier circuit 42 to receive D.C. energization from generator stator winding 16.

Exciter rotor winding 30 is connected through a rotating rectifier circuit 44 to supply D.C. energization to generator field winding 20.

FIG. 2A shows in detail a portion of exciter core structures 32' and 38', along with exciter stator windings 34' and 36', suitable for use in the generator of FIG. 1, in the view being in transverse section. FIG. 2B illustrates the core structures of FIG. 2A in a sectional view taken perpendicular to that of FIG. 2A. These figures show exciter rotor slots 30a and other mechanical features not requiring further description in connection with the disclosure of the present invention.

The circuit diagram of FIG. 3 shows the electrical connections and further electrical characteristics of the preferred form of the invention already discussed in connection with FIG. 1. The generator may be of the synchronous type with three phase star-connected winding 16 supplying A.C. output to terminals $T_1$, $T_2$ and $T_3$. Rectifier circuit 42 is shown as a three phase bridge rectifier connected in series in the neutral connection between the phases of winding 16. Exciter stator field winding 36 is connected to the output of rectifier 42 to be energized with a D.C. current proportional to the A.C. current in the generator winding 16. A ground connection is shown at 46 for connection to the generator load (not shown).

The exciter control field winding 34 is energized from rectifier circuit 40 through a connection 48 at a point on one of the phase windings of generator winding 16 at a location adjacent the neutral connection of the windings 16. A potentiometer 50 in series with this connection permits adjustment of the A.C. voltage impressed on rectifier circuit 40 and consequently of the D.C. voltage impressed on exciter winding 34. One end of the rectifier is grounded at 51. A zener diode 40a, preferably of the selenium type, is connected across the output of the rectifier diode 40. The rectifier circuit 40 is shown as a standard package four-rectifier bridge for simplicity and to save cost although a usual two rectifier circuit may be used in place thereof if desired.

The exciter rotor winding 30 is preferably a three phase winding with its output energizing rotating rectifier circuit 44 to supply D.C. energization of generator winding 20 therefrom. The rectifier circuit is preferably made up of a standard package of two semiconductor bridges as shown, although other standard three phase rectifier circuits such as one of the configurations of the rectifier circuit 42 for energizing exciter stator winding 36, may be used. A zener diode 52 which may be of the selenium type, is connected across the output of the rectifier 44 and the generator field winding to act as a surge suppressor.

The dynamo electric apparatus heretofore described in connection with FIGS. 1 and 3 operates generally as a synchronous generator with brushless type excitation but provides certain new and improved features. Rotation of shaft 24 by prime mover 28 rotates the field winding 20 of the generator 10 relative to the stator 16 thereof. The shaft 24 simultaneously rotates the rotor winding 30 of the exciter relative to the control field winding 34 and compounding field winding 36 of the stator thereof. A small amount of the generator voltage taken from its stator winding at 48 is adjusted to provide sufficient excitation to the control field to cause the exciter to apply sufficient current to generator field winding 20 to maintain the desired generator voltage at no load condition. The compounding winding 36 is energized through rectifier 42 with a current directly proportional to the generator load current and provides additional excitation of the exciter to keep its output to generator field winding 20 sufficient to maintain the generator voltage approximately constant for varying generator load conditions. The zener diodes 40a and 52 provide surge suppression to absorb transient voltages that might occur when heavy loads are switched on a system to which the generator is connected.

A feature of the present invention as discussed is the energization of the three phase rectifier circuit for supplying the exciter compounding winding 36 in series in the neutral connection of the generator stator winding so that the rectifiers will be near ground potential. Since the exciter compounding winding is a very low impedance winding as compared to the rated generator load impedance, the actual voltage seen by the rectifiers is a very small fraction of the generator terminal voltage. This minimizes the possibility of failure to ground and contrasts sharply with circuit arrangements in which the rectifiers are exposed to rated voltage to ground.

Also, the connection of point 48 for providing voltage to rectifier circuit 40 for the exciter control field winding at a location near the neutral point results in minimum voltage across the rectifiers of this circuit.

The system additionally eliminates the need for the power current and potential transformer of prior art machines, resulting in fewer parts and lower cost.

FIG. 4 illustrates a modification of the machine of FIG. 3 wherein a circuit employing a voltage regulator 54 is used to energize the exciter control field winding 34. The tap connection and rheostat 50 shown in FIG. 3 are omitted. The voltage regulator which is connected across a pair of generator output terminals, as $T_1$, $T_2$, may be of standard construction and include means for providing a rectified output. The voltage regulator permits accurate voltage regulation for all loading and temperature conditions, plus basically the same operating advantages described herein.

FIG. 5 shows a portion of a circuit diagram with generator stator winding 16 associated with rectifier circuit 42 for energizing exciter compound winding as in the circuit of FIG. 3. However, the ground connection is not shown as necessarily made at point 46 of the rectifier circuit in FIG. 3. Instead, FIG. 4 shows a plurality of points in the circuit designated G1, G2, G3, G4, G5 and G6, respectively. The ground connection may be made at any of these points G1 through G6 while still offering the advantage of protecting the rectifiers from exposure to a high voltage, as fully discussed in describing the operation of the first described embodiment of the invention.

FIG. 6 shows another preferred embodiment of the invention. Since this embodiment may be the same as that of FIG. 3 except for the exciter compounding or forcing field connections, corresponding elements are numbered as in FIG. 3. In FIG. 6, three phase windings 16A, 16B and 16C of generator stator winding 16' are star connected with their neutral point grounded at 60. Connected in series between phase winding 16A and its neutral point is a bridge type full-wave rectifier circuit 62. Exciter compounding field 36 is connected for energization with rectified D.C. current from the bridge circuit. This energization will vary in proportion to the load current of the generator to act through the exciter to maintain uniform generator output voltage in a manner similar to that described in connection with FIGS. 1 through 3. The output of exciter rotor winding 30 is shown connected through three phase rectifier 44' to energize generator filed winding 20. Zener diode (not shown) may be used as at 40a and 52 in FIG. 3.

FIG. 7 illustrates a preferred form of my invention employing a generator stator with a single phase winding. This winding comprises two portions 16A' and 16A", each of which may preferably have approximately the same number of turns. The inner end of one winding portion, as 16A', is connected to ground at 60'. Between the two winding portions is connected a full wave rectifier circuit 62', which circuit energizes compounding field winding 36' with rectified D.C. current. Since one terminal of rectifier circuit 62' is connected to ground at 60', this embodiment of the invention also limits the voltage imposed on the rectifiers and minimizes the possibility of failure to ground.

While the exciter rotor winding is illustrated in the above described embodiments of my dynamo electric machine is a three-phase winding, it will be recognized that a single phase winding may be employed instead. Also, various other modifications may appear that are within the spirit and scope of the invention. The present embodiments are therefore to be considered in all respects as illustrative and not restrictive, the scope of the invention being indicated by the appended claims rather than the foregoing description.

I claim:

1. A brushless dynamo electric machine comprising:
   a generator with a stator winding including a neutral connection at an intermediate point thereof and a rotor field winding;
   an exciter including a rotor winding and cooperating control field and compound field windings;
   first circuit means including first rectifier means connected to energize said control field winding of the exciter in relation to the voltage of said generator stator winding;
   second circuit means including second rectifier means connected to said generator stator winding in close proximity to said neutral connection thereof for energizing said compounding field winding of the exciter in proportion to the amplitude of current in said generator stator winding, and
   rotary rectifier means connected to energize said rotor field winding with a D.C. voltage related to the A.C. voltage of said rotor winding.

2. A brushless dynamo electric machine as recited in claim 1 wherein said neutral connection is connected to ground.

3. A brushless dynamo electric machine as recited in claim 1 wherein said stator winding of said generator is polyphase winding.

4. A brushless dynamo electric machine as recited in claim 3 wherein said polyphase stator winding of said generator is a three-phase winding.

5. A dynamo electric machine as recited in claim 4 wherein said second circuit means comprises a three-phase rectifier circuit connected in the neutral connection of said three-phase stator winding.

6. A dynamo electric machine as recited in claim 4 wherein said second circuit means is connected to ground.

7. A dynamo electric machine as recited in claim 4 wherein a rectifier in said second circuit means is connected to ground.

8. A dynamo electric machine as recited in claim 5 wherein a ground connection is made to said compounding field winding.

9. A dynamo electric machine as recited in claim 4 wherein said compounding winding is a single phase winding.

10. A dynamo electric machine as recited in claim 4 wherein a ground connection is made to a point on a circuit including said second circuit means and said exciter compounding winding.

11. A dynamo electric machine as recited in claim 4 wherein said first rectifier means includes a connection across a portion of a phase winding of said stator winding at the neutral end thereof.

12. A dynamo electric machine as recited in claim 4 wherein said first circuit means includes a voltage regulator.

13. A brushless dynamo electric machine comprising:
   a synchronous generator comprising a three-phase stator winding including a neutral connection between phases thereof and a single phase rotor field winding;
   a brushless exciter including a rotor winding and cooperating stator control field and compounding field windings;
   rotary rectifier means connected to energize said rotor field winding of the generator with a D.C. voltage derived from an A.C. current in said exciter rotor winding;
   first circuit means including a first rectifier means connected to energize said control field winding to excite said exciter rotor winding for no load voltage regulation of said generator;
   second circuit means including second rectifier means connected in series in said neutral connection between phases of said generator stator winding for energizing said compounding field winding in proportion to the amplitude of current in said generator stator winding.

14. A dynamo electric machine as recited in claim 11 wherein means is included to connect a point in a circuit including said compounding field winding and said second circuit means to ground.

* * * * *